United States Patent [19]

Tilley

[11] Patent Number: 5,229,481
[45] Date of Patent: Jul. 20, 1993

[54] HIGH-MOLECULAR WEIGHT, SILICON-CONTAINING POLYMERS AND METHODS FOR THE PREPARATION AND USE THEREOF

[75] Inventor: T. Don Tilley, San Diego, Calif.

[73] Assignee: The Regents of the University of California, Oakland, Calif.

[21] Appl. No.: 676,636

[22] Filed: Mar. 28, 1991

[51] Int. Cl.$^5$ .............................................. C08G 77/08
[52] U.S. Cl. ........................................ 528/10; 528/31; 528/43; 556/430; 556/432
[58] Field of Search ............................ 528/43, 10, 31; 556/430, 432

[56] References Cited

U.S. PATENT DOCUMENTS

| | | | |
|---|---|---|---|
| 3,278,461 | 10/1966 | Wu | 260/2 |
| 4,100,233 | 7/1978 | Yajima et al. | 423/345 |
| 4,110,386 | 8/1978 | Yajima et al. | 264/29.5 |
| 4,117,057 | 9/1978 | Yajima et al. | 264/63 |
| 4,159,259 | 6/1979 | Yajima et al. | 528/14 |
| 4,397,722 | 8/1983 | Haller | 528/43 |
| 4,455,414 | 6/1984 | Yajima et al. | 528/30 |
| 4,590,253 | 5/1986 | Hasegawa et al. | 528/14 |
| 4,741,931 | 5/1988 | Lin et al. | 427/387 |
| 4,869,854 | 9/1989 | Takeda et al. | 264/22 |
| 4,916,038 | 4/1990 | Lau et al. | 428/447 |
| 4,965,386 | 10/1990 | Watson et al. | 556/430 |
| 4,992,520 | 2/1991 | Zeigler | 528/10 |
| 5,087,685 | 2/1992 | Sartori et al. | 528/25 |

OTHER PUBLICATIONS

Woo et al. Journal American Chemical Society 1989, 111 pp. 8043–8044.
Aitken et al., Structural Studies of Oligosilanes Produced by Catalytic Dehydrogenative Coupling of Primary Organosilanes, Chem. Dept. McGill Univ., 1804–1809, Oct. 1986.
Aitken et al., Polymerization of Primary Silanes to Linear Polysilanes Catalyzed by Titanocene Derivatives, Journal of Organometallic Chemistry, (1985), C11–C13.
Aitken et al., A Survey of Catalytic Activity of $\eta^5$-Cyclopentadienyl Complexes of Groups 4–6 and Uranium and Thorium for the Dehydrocoupling of Phenylsilane, Chem. Dept. McGill Univ., 1732–1736, Dec. 2, 1988.
Aitken et al., Identification of Some Intermediates in the Titanocene-Catalyzed Dehydrogenative Coupling of Primary Organosilanes, J. Am. Chem Soc., 1986, 108, 4059–4066.
Harrod, Polymerization of Group 14 Hydrides by Dehydrogenative Coupling, Dept. of Chemistry Univ. 1987, 28, 403–404.
Hong et al., Synthesis and Photodegradation of Poly[2,5-bis(dimethylsilyl)furan], Polymer Bulletin 22, 363–369 (1989).
Hu et al., Synthesis and Photodegradation of Poly[2,5-bis(dimethylsilyl)thiophene], Polymer Bulletin 21, 133–140, (1989).
Loker et al., Synthesis and Photodegradation of Poly[2,5-bis(dimethylsilyl)naphthalene], Polymer Bulletin 22, 355–362, (1989).
Nate et al., Double-Layer Lithography Using Organo-silicon Deep UV Positive Resist. Electrochem. Soc. Extended Abstracts, 1984, 94(2), 778.

(List continued on next page.)

Primary Examiner—John C. Bleutge
Assistant Examiner—Margaret W. Glass
Attorney, Agent, or Firm—Robbins, Dalgarn, Berliner & Carson

[57] ABSTRACT

Polymer materials are described, which are formed by polymerization of monomer mixtures containing at least one compound of the formula I $$(RH_2Si)_xA \qquad (I)$$

wherein R is selected from the group consisting of hydrogen, unsubstituted alkyl, substituted alkyl, unsubstituted aryl and substituted aryl; A is a polyvalent moiety; and x is 2–4. Methods for preparation of polymers derived from monomer mixtures consisting essentially of polyvalent polysilanes, as well as mixtures of polysilanes with monovalent monosilanes, are also described.

14 Claims, No Drawings

OTHER PUBLICATIONS

Nate, Photolysis of Polymeric Organosilicon Systems. 4. Photochemical Behavior of Poly[p-(disilanylene)phenylene], Organometallics 1987, 6, 1673–1679.

Sakurai et al., Dual Flourescence of Aryldisilanes and Related Compounds. Evidence for the Formulation of $^{1}(\sigma\pi^*)$Orthogonal Intramolecular Charge-Transfer States, J. Phys. Chem., 1990, 94, 1837–1843.

Shina, The First Successful Ring Opening Polymerization at the Si-Si Bond: A Novel o-(Disilanylene) Phenylene Polymer, J. of Organometallic Chem., 310 (1986), C57–C59.

HIGH-MOLECULAR WEIGHT, SILICON-CONTAINING POLYMERS AND METHODS FOR THE PREPARATION AND USE THEREOF

This invention was made with Government support under Contract No. AFOSR-88-0273 awarded by the U.S. Air Force. The Government has certain rights in this invention.

BACKGROUND OF THE INVENTION

The present invention relates to silicon-containing polymers and methods for the preparation and use thereof. In particular, the present invention is directed to novel high-molecular weight silicon-containing polymers which may exhibit high degrees of branching and/or cross-linking, as well as to novel monomers and methods for use in the preparation thereof.

Polysilanes and other silicon-containing polymers have been the focus of considerable interest, in particular because of their unusual optical and electronic properties. An interesting class of silicon-containing polymers are the poly[(disilanylene)-arylene]s, for which orbital interactions of the aromatic $\pi$-system with the adjacent disilanylene units are possible. The heretofore known compounds have the general formula:

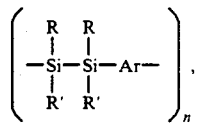

in which R and R' are independently selected from alkyl and aryl, Ar is an arylene and n is relatively low.

For example, Nate et al. have described the preparation of p-(disilanylene)-phenylene polymers by reaction of 1,4-di(chloroethylmethyl-silyl)benzene or 1,4-di(-chloromethylphenyl) benzene with sodium metal in toluene [Nate, K. et al., Electrochem. Soc. Extended Abstr. 94(2):778 (1984)]. The polymers were reported to have strong absorption in the ultraviolet region and considered to be able to act as positive working photoresists. After exposing these polymer films through a photomask, a positive resist pattern with fine line resolution was obtained, using a mixture of toluene-isopropylalcohol as developer and isopropylalcohol as rinser. The photosensitivity of the resist film was enhanced by addition of radical trapping agents. Poly[(-disilanylene)-phenylene] polymers prepared by Wurtz-type coupling reactions have been reported with molecular weights of ca. 20,000–35,000. [Nate, K. et al., Organometallics 6:1673 (1987)].

The Lewis acid-catalyzed ring opening polymerization of 1,1,2,2-tetramethyl-1,2-disilabenzocyclobutene in a sealed tube has been reported to yield poly[o-(disilanylene)phenylene]s with higher molecular weights ($M_n = 56,000-350,000$); in view of ring strain in the monomer, the polymerization is reported to occur spontaneously [Shiina, K., J. Organomet. Chem 310. C57 (1986)]. The high-molecular weight, cotton wool-like material was soluble in solvents such as benzene, THF, cyclohexane, carbon tetrachloride and chloroform.

More recently, (disilanylene)phenylene polymers containing naphthalene [Lee, S.-J. H. and Weber, W. P., Polymer Bulletin 22, 355 (1989)], thiophene [Hu, S.-S. and Weber, W. P., Polymer Bulletin 22, 355 (1989)], and furan [Hong, H. H. and Weber, W. P., Polymer Bulletin 22, 363 (1989)] arylene subunits have been obtained via reductive Wurtz coupling methods. All three of these polymers show a shift of $\lambda_{max}$ to longer wavelength compared to the corresponding monomers, suggesting some degree of $\sigma$-$\pi$ conjugation. Photolysis of these compounds in benzene/methanol solution led to their rapid degradation.

Photodegradation studies of (disilanylene)phenylene polymers indicates their utility as possible photoresist materials. In addition, organic silicon polymers having high moldability and processability can be shaped, as preceramic materials, into suitable forms such as fibers or sheets; the polymers, alone or in admixture with other ceramic precursor materials and/or metals, may then be sintered to obtain final ceramic or cermet products. Some silicon-containing polymers further have utility as binders, coating materials, coupling agents, adhesives and adhesion promoters. As disclosed in U.S. Pat. No. 3,278,461 to Wu, the entire disclosure of which is hereby incorporated by reference, polymers containing silicon-silicon bonds are particularly desirable, in that the silicon-silicon bond acts as a "scavenger" of oxygen, so that at elevated temperatures, particularly in oxidizing atmospheres, the material containing silicon-silicon bonds is not destroyed by oxygen; the oxygen merely reacts with the silicon-silicon bond under such circumstances to form silicon-oxygen linkages.

Unfortunately, preparative methods useful for synthesis of these polymers on a commercial scale had not been developed. Moreover, the known methods have been limited to the use of monomers having tertiary silicon centers (i.e., monomers of the general formula XSiRR'-Ar-R'RSiX, wherein neither R nor R' may be hydrogen).

Methods for the preparation of polysilanes, on the other hand, have been developed recently to make commercial-scale synthesis of those materials economically feasible. In particular, Zr- and Hf-catalyzed dehydrocoupling reactions of hydrosilanes (Cp = $\eta^5$-C$_5$H$_5$, Cp* = $\eta^5$-C$_5$Me$_5$) have been developed and characterized as metal-mediated step-growth polymerizations [Woo, H.-G. and Tilley, T. D., J. Am. Chem. Soc. 111:8043 (1989). Reactions of this type, originally described by Harrod and coworkers, appear to represent an important new method for forming Si-Si bonds and generating Si-containing polymers [Aitken, C. et al., J. Organomet. Chem. 279:C11 (1985); Aitken, C.T. et al., J. Am. Chem. Soc. 108:4059 (1986)]. This method, however, has heretofore been applicable to produce polymers of only modest chain lengths (generally $\leq$ ca. 50 silicon atoms) from monosilane monomers.

It is an object of the present invention to provide silicon-containing polymers of higher molecular weight than have heretofore been produced using the known synthetic methods.

It is a further object of the invention to provide methods for the preparation of silicon-containing polymers in which there is a significant degree of branching and/or cross-linking between silicon centers.

It is yet another object of the present invention to provide silicon-containing polymers derived from polyfunctional monomers comprising primary and secondary silicon centers.

It is a further object of the invention to provide high molecular weight, processable silicon-containing polymers for use in the preparation of films, fibers and the like.

It is an additional object of the present invention to provide novel monomers for use in the preparation of silicon-containing polymers.

SUMMARY OF THE INVENTION

In accordance with the present invention, silicon-containing polymers having higher molecular weights are obtained via incorporation of two or more hydrosilyl functionalities into the monomer. Reaction of only one Si—H group per silicon center is required for chain growth. The reaction of more than one Si—H group per silicon center leads to cross-linking of chains, and thus increased molecular weights. In addition to polymers derived from monomer mixtures consisting essentially of di- and polyfunctional disilanes, novel polymeric materials derived from monomer mixtures comprising monosilanes are also provided.

DETAILED DESCRIPTION OF THE INVENTION

In accordance with the present invention, there is provided polymer materials formed by polymerization of a monomer mixture comprising at least one compound of the formula I:

$$(RH_2Si)_xA \qquad (I)$$

wherein
R is selected from the group consisting of hydrogen, unsubstituted alkyl, substituted alkyl, unsubstituted aryl and substituted aryl;
A is a polyvalent moiety; and
x is 2–4.

Suitable polyvalent moieties for A include any number of structures well known in the art which would be capable of bearing at least two $RH_2Si$-groups as substituents. Such moieties include, but are not limited to: unsubstituted aliphatic hydrocarbons including unsaturated hydrocarbons, such as alkenes (e.g., trans. trans-1,3-butadienyl) and alkynes (e.g., 2-propynyl) containing 1 to about 20 carbon atoms; substituted aliphatic hydrocarbons; unsubstituted aryl groups; substituted aryl groups, unsubstituted heteroaryl groups; substituted heteroaryl groups; organometallic complexes (such as ferrocenes), which would introduce redox centers into the polymer backbone; and silanes containing 1 to about 20 silicon atoms, which would provide polysilanes (i.e., polymers with an all-silicon backbone). Alkyl-substituted aryl moieties (e.g., as in 2,5-dihexyl-1,4-($H_3Si$)benzene) are particularly interesting, in that the alkyl groups improve the solubility of the polymer product.

Useful aliphatic hydrocarbons (for A) and alkyl groups (for R) include straight- and branched-chain alkyl groups of 1 to about 20, preferably 1 to about 10, carbon atoms and cycloalkyl groups of 3 to about 10 carbon atoms. While hydrocarbons (i.e., groups comprising only hydrogen and carbon) are generally contemplated, the presence of one or more heteroatoms (such as oxygen, nitrogen, sulfur or halogen) may in some instances also be acceptable. Suitable aryl groups include phenyl, benzyl, naphthyl, anthracyl and biphenyl. Suitable heteroaryl groups include aromatic ring systems containing one or more nitrogen, oxygen and/or sulfur atoms.

Further, the alkyl, aryl and heteroaryl groups contemplated in accordance with the present invention may be substituted or unsubstituted. By substituted, it is meant that one or more substituents are present which do not have an adverse impact upon the course of the polymerization reaction. Such substituents include, but are not limited to, those substituents which are known not to react with catalysts in dehydrogenerative polymerization of silanes (for example, halogen, alkyl, alkoxy, $Cr(CO)_3$, etc.).

The general chain-extension reaction involving an exemplary difunctional disilane is illustrated in equation (1):

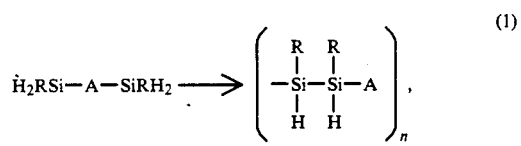

wherein R and A are as previously defined. The application of this synthetic method is exemplified by the synthesis of high molecular weight poly(arylenesilanylene)s, poly(alkylenesilanylene)s and poly(heteroarylenesilanylene)s from the corresponding disilyl monomers, using, e.g., $[CpCp^*ZrH_2]_2$ as a catalyst. These polymers (and in particular, the polymers derived from monomers containing primary hydrosilyl functionalities) have low solubilities in common organic solvents, apparently because of extensive cross-linking via silicon atoms, as illustrated generally in equation (2):

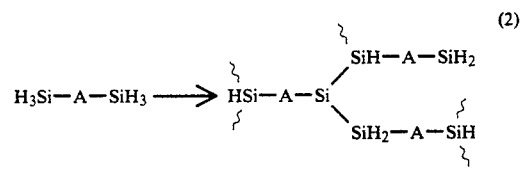

As is readily apparent from equation (2), each primary silicon center may be joined to a single additional silicon center (resulting in a chain-lengthening) or two additional silicon centers (resulting in a branching or, potentially, a cross-linking between branches in a polymer chain or two separate polymer chains). Accordingly, a wide range of homopolymers having widely divergent structures may be derived, based upon modification of reaction conditions to vary the degree of chain-extension or branching reactions. A similar range of possibilities exists with respect to copolymers comprised of two or more polyfunctional monomers containing primary silicon centers. Monomers containing additional primary silane centers (e.g., $1,3,5-(H_3Si)_3C_6H_3$) permit even greater degrees of branching and/or cross-linking.

In addition, the inventive method is also applicable to the synthesis of polymers derived from polyfunctional monomers containing secondary silicon centers (i.e., monomers containing two or more -$SiRH_2$ groups, in which R is other than hydrogen). In homopolymers derived from such monomers (or copolymers derived from mixtures of such monomers), there is the possibility of som branching and/or cross-linking as well; in general, however, the expected degree of cross-linking is substantially less than would be the case with monomers containing only primary silicon centers.

Finally, the inventive method may be employed to produce polymers from monomeric mixtures comprising both monomers containing polyfunctional polysilanes and other monomers, such as for example monosilane monomers. In this class of products, the content of polyfunctional polysilanes determines the nature and extent of branching and/or cross-linking. Further, the introduction of even small amounts of polyfunctional polysilane monomer enables the production of polymers having substantially higher molecular weights than would be possible using only monosilanes as monomers. For example, polymerization of a 9:1 mixture of $PhSiH_3$-$H_3SiC_6H_4SiH_3$ results in significant quantities of polysilane with molecular weights 5–10 times greater than those heretofore obtained using $PhSiH_3$ alone.

The dehydrogenative polymerizations of $SiH_3$- and $RSiH_2$-containing monomers are carried out in solvents inert to the polymerization catalysts and the monomers. Suitable solvents include, but are not limited to, benzene, toluene, xylene, ethylbenzene, alkanes such as hexane, heptane, decane, tetradecane, cyclohexane, etc.

The polymerization reaction is suitably carried out at atmospheric pressure under an inert atmosphere, as the reactants and/or catalyst may be susceptible to oxidation. Suitable inert gases include nitrogen, argon, helium and hydrocarbons. The polymerization reaction is typically effected at ambient or slightly elevated temperatures, and is generally exothermic. The preferred reaction temperature is in the range of about 25° to about 200° C., preferably about 25° to about 80° C.

The catalyst comprises a $d^0$ or $d^{0f^n}$ hydride or a precursor thereof, in an amount effective to promote polymerization, generally in accordance with a mechanism as proposed for monosilanes in Woo et al. Exemplary metals for formation of the catalytic hydrides or precursors include zirconium, hafnium, neodymium, lanthanide group metals and actinide groups metals. Examples of suitable hydrides or precursors thereof for use as catalysts in accordance with the present invention include $CpCp*M[Si(SiR_3)_3]Cl$, in which Cp is cyclopentadienyl, $Cp*$ is pentamethylcyclopentadienyl, M is Zr or Hf and R is alkyl or aryl; $CpCp*M[Si(SiR_3)_3]R'$, in which M is Zr or Hf, and R and R' are independently alkyl or aryl; $Cp*_2MH_2$, in which M is as previously defined; $Cp_2MR_2$, in which M and R are as previously defined; $[Cp*_2M'H]_2$, in which M' is Nd or Sm; $Cp_2TiR_2$, in which R is as previously defined; and precursors of these compounds. Particularly suitable catalysts have the general formula $[CpCp*MH_2]_2$, wherein M is Zr or Hf. A wide range of catalyst concentrations would be effective in accordance with the present invention; concentrations on the order of about 0.1 to about 20 mol-%, and preferably about 1 to about 5 mol-%, are suitable. A solution employing approximately 2 mol % of $[CpCp*ZrH_2]_2$ as catalyst has, for example, been found effective for polymerization.

Upon addition of the silane to a solution of the catalyst, reaction occurs with hydrogen evolution. The polymers are generally isolated as off-white solids by filtration in air. In view of the substantial degrees of cross-linking, many of the polymeric products were insoluble in most solvents tested.

Empirical formulas for the polymers were determined by combustion analyses and by integration of CRAMPS solid state $^1H$ NMR spectra. Agreement between these methods varies from sample to sample. In the polymerization of $2,5\text{-}(H_3Si)_2C_4H_2S$, a significant degree of ring reduction is observed, making determination of empirical formulas and cross-linking values from the CRAMPS NMR spectrum and combustion analyses problematic. For $[1,4\text{-}(H_xSiC_6H_4SiH_x)]_n$, $[1,3\text{-}(H_xSiC_6H_4SiH_x)]_n$, and $[4,4'\text{-}(H_xSiC_6H_4C_6H_4SiH_x)]_n$, there is good agreement between the two sets of cross-linking values, and a high degree of cross-linking is indicated in each case (approximately 40–70%). There is a lower degree of cross-linking in $[1,3,5\text{-}(H_xSi)_3C_6H_3]_n$ (approximately 20%); it should be noted, however, that even a polymer with the empirical formula $[1,3,5\text{-}(H_2Si)_3C_4H_3]_n$, would be a highly cross-linked polymer. It is therefore possible that gelation occurred before extensive dehydrocoupling could take place.

These polymers are all insoluble in most organic solvents tested and are high melting (mp >300° C). Thermal Gravimetric Analysis (TGA) shows that $[1,4\text{-}(H_xSiC_6H_4SiH_x)]_n$, is thermally stable under an argon atmosphere, losing only 5% of its initial weight by 350° C. At 700° C., the residue remaining is equal to 80% of the initial sample weight, a substantially higher percentage than previously reported for other silanylene arylene polymers. X-ray powder diffraction analyses of $[1,4\text{-}(H_xSiC_6H_4SiH_x)]_n$, and $[4,4'\text{-}(H_xSiC_6H_4C_6H_4SiH_x)]_n$, provide no evidence for crystallinity in these samples. It therefore appears that these materials adopt amorphous network structures, as generalized in equation 2.

Scanning Electron Microscopy (SEM) and BET (BrunhauerEmmett Teller) adsorption analysis also support the existence of network structures. The scanning electron micrograph of $[1,4\text{-}(H_xSiC_6H_4SiH_x)]_n$ shows a granular structure, with no indications of organized structure. Pore analysis ($N_2$, BET) confirms the absence of any macropores in $[1,4\text{-}(H_xSiC_6H_4SiH_x)]_n$. The surface area determined by BET was ca. 600 m$^2$/g, which is similar to values reported for zeolites. In an attempt to obtain further information about the nature of the solid state structures of these polymers, solid state CP/MAS $_{29}Si$ NMR spectra of $[1,4\text{-}(H_xSiC_6H_4SiH_x)]_n$, $[1,3\text{-}(H_xSiC_6H_4SiH_x)]_n$, $[1,3,5\text{-}(H_xSi)_3C_6H_3]_n$ and $[4,4'(H_xSiC_6H_4C_6H_4SiH_x)]_n$ were obtained. These spectra showed only a single peak at $\delta -60.6$ in each case; there was no distinction of different types of silicon centers (e.g. cross-linked vs. non-cross-linked).

UV-vis spectroscopy shows a shift of $\lambda$max to longer wavelength for $[1,4\text{-}(H_xSiC_6H_4SiH_x)]_n$ (260nm) and $[4,4'(H_xSiC_6H_4C_6H_4SiH_x)]_n$ (295nm), compared to their respective monomers $(1,4\text{-}(H_3SiC_6H_4SiH_3)$ (240nm) and $4,4'\text{-}(H_3SiC_6H_4C_6H_4SiH_3$ (265nm). The $\lambda$max value for $[1,4\text{-}(H_xSiC_6H_4SiH_x)]_n$ is similar to that reported for thin films of $[1,4\text{-}(MePhSiC_6H_4SiMePh)]_n$ (254nm) and $[1,4\text{-}(MeEtSiC_6H_4SiEtMe)]_n$ (262nm)

Conductivity measurements performed using the four probe method showed that all polymers synthesized were insulators. Exposure of $[4,4'\text{-}(H_xSiC_6H_4C_6H_4SiH_x)]_n$ to $SbF_5$ vapor resulted in measurable conductivity values; the doped product was found to possess a conductivity of ca. $10^{-4}$ S/cm.

The polymers of the present invention thus have very different properties than polymers which have been prepared previously by Group IV metallocene catalyzed dehydrocoupling. The physical properties found for these polymers are consistent with a substantial degree of cross-linking, and the UV-vis and conductivity data confirm the possibility of $\sigma-\pi$ delocalization in the —(Si-Si-Ar)— backbone.

The novel polymers are useful for a variety of purposes known for prior art polysilanes, including as photoresists, passivating layers, encapsulation materials, silicon carbide precursors, chemical processing, etc. Polymers wherein A is aryl or heteroaryl may exhibit substantial σ—π conjugation and are generally dopable; in addition, conductivity measurements and UV/vis spectroscopy confirm electron delocalization in these materials. Therefore, such polymers may be employed in a manner known per se for use of conductive polymers. Such uses include the fields of optoelectronics (for example, the preparation of electrochromic devices); semiconductor devices; solar energy conversion devices, such as photovoltaic cells; molecular-based computers and memory storage systems; and electrophotography.

While some of the monomers useful in preparing the polymers of the present invention are already known, in accordance with another aspect of the invention, methods are provided for the preparation of both known and novel polyfunctional polysilanes. An exemplary method used to prepare disilyl monomers is described below. Briefly, the method comprises reacting the corresponding dibromo compound with magnesium and $Si(OEt)_4$ or $RSi(OEt)_3$, in which R is alkyl or aryl, in a tetrahydrofuran (THF) solution with application of heat, followed by lithium aluminum hydride reduction of the intermediate compound containing triethoxysilyl groups. Convenient routes to di-(trialkoxy-siloxy)arene compounds have recently been described employing Barbier-Grignard reactions of 1,4-dibromobenzene and 4,4'-dibromobiphenyl with tetraethoxysilane to obtain 1,4-di(triethoxysiloxy)benzene and 4,4'-di(triethoxysiloxy)biphenyl, respectively.

Using this methodology, synthesis of 1,3- di(triethoxysilyl)-benzene, 1,3,5-tri(triethoxysilyl)benzene, and 2,5-di(triethoxy-silyl)thiophene has been accomplished. Reductions of these compounds with lithium aluminum hydride give the corresponding hydrosilanes in good isolated yields. Spectroscopic data for 1,4-disilylbenzene [1,4-$(H_3Si)_2C_6H_4$], 1,3-disilylbenzene [1,3-$(H_3Si)_2C_6H_4$], 1,2-disilylbenzene [1,2-$(H_3Si)_2C_6H_4$], 1,3,5-trisilylbenzene [1,3,5-$(H_3Si)_3C_6H_3$], 2,5-disilylthiophene [2,5-$(H_3Si)_2C_4H_2S$], and 4,4'-disilylbiphenyl [4,4'-$H_3Si)_2C_6H_4C_6H_4$] are provided in the examples below. 1,4($H_3Si)_2C_6H_4$ and 1,3-$(H_3Si)_2C_6H_4$ have previously been reported. Except for 4,4'-$(H_3Si)_2C_6H_4C_6H_4$ (mp 166-168° C.), these hydrosilanes are liquids at room temperature.

The invention may be better understood with reference to the accompanying examples, which are not to be construed as limiting the scope of the invention in any sense.

EXAMPLES

Manipulations were carried out under an atmosphere of nitrogen or argon using Schlenk techniques and/or a Vacuum Atmospheres glovebox. Dry, oxygen-free solvents were employed unless otherwise noted. Elemental analyses were performed by Microanalytisches Labor Pascher. Infrared spectra were recorded on a Perkin-Elmer 1330 infrared spectrometer. NMR spectra were obtained with a GE QE-300 instrument at 300 MHz ($^1H$), 75.5 MHz ($^{13}C$), and 59.6 MHz ($^{29}Si$). An INEPT sequence was employed to enhance signals of $^{29}Si$ spectra [Blinka, T. A. et al., Adv. Organomet. Chem 23:193 (1984)]. The solid-state combined rotation and multiple pulse spectroscopy (CRAMPS) $^1H$ NMR spectra and the solid-state cross polarization/magic angle spinning (CP/MAS) $^{29}Si$ NMR spectra were obtained on a modified Nicolet spectrometer operating at 150 MHz ($^1H$) and 29.8 MHz ($^{29}Si$). Rapid sample rotation at the magic angle averages chemical shift anisotropy, and the multiple pulse sequence averages the strong proton-proton dipolar interaction. The proton spectra were referenced by assigning the methyl resonance of tetrakis-(trimethylsilyl)silane (TTMSS) a shift of 0.38 ppm. The silicon spectra were referenced to external TTMSS at −9.7 ppm vs $SiMe_4$. The values reported for the average degree of cross-linking were determined by comparing the empirical formulas calculated from the solid-state CRAMPS $^1H$ NMR spectrum or the combustion analysis with those for a linear (disilanylene)arylene polymer (0% cross-linking) and for a polymer which had undergone dehydrocoupling at two hydrogens on silicon (100% cross-linking) The cross-linking values calculated from the combustion analyses were based on the hydrogen analyses only, because the carbon analyses were consistently too low to correspond to a reasonable empirical formula, possibly due to SiC formation under the conditions of the analysis. The specific surface area was measured by the BET absorption analysis method on a Quantachrom QSJR-3 instrument using $N_2$ gas. X-ray powder diffraction measurements were obtained with an APD 3600 X-ray powder diffractometry. Scanning electron micrographs were recorded on a Stereoscan 360 (Cambridge Instruments) scanning electron microscope. All samples were precoated with a gold film to minimize surface charging. Conductivities were determined using pressed pellets of each polymer, and measured under an inert atmosphere by the four point probe method. Doping with $SbF_5$ vapor was performed by placing the pellet in a chamber with $SbF_5$ at its vapor pressure. Melting points were determined with a Thomas Hoover Unimelt apparatus and are uncorrected. 1,2-dibromobenzene, 1,3-dibromobenzene, 2,5-dibromothiophene, and 1,3,5-tribromobenzene were purchased from Aldrich Chemical Co. and dried over molecular sieves and degassed before use. 1,4-dibromobenzene and 4,4'-dibromodegassed biphenyl (Aldrich) were used as received. Tetraethyl orthosilicate (Aldrich) was distilled before use. $LiAlH_4$ (Aldrich) was recrystallized from diethyl ether before use. 1,4-Di(triethoxysilyl)benzene and 4,4'-di(triethoxysilyl)biphenyl were obtained by the method of Shea et al. [Chem. Materials 1:572 (1989)]. [$CpCp^*ZrH_2]_2$ was prepared according to the procedure of Wolczanski et al. [Organometallics 1:793 (1982)].

EXAMPLE 1

Preparation of monomers 1.3-Di(triethoxysilyl)benzene. Magnesium chips (28.0 g, 1.15 mol) and freshly distilled tetraethoxysilane (450 mL, 2 mol) in tetrahydrofuran (750 mL) were placed under nitrogen in a 2 L 3-neck flask equipped with a magnetic stir bar, a condenser, and an additional funnel. A small crystal of iodine was added in order to activate the magnesium. A solution of 1,3-dibromobenzene (100.0 g, 0.424 mol) in tetrahydrofuran (250 mL) was added slowly. When ca. 25 mL of the dibromide had been added, the addition was stopped and stirring was continued until a mildly exothermic reaction began (usually within 20-30 minutes). The addition of dibromobenzene was continued and held at such a rate as to maintain the solution at reflux. After the addition was complete, the reaction mixture was stirred for two additional hours. The resulting brown solution was filtered from the remaining magnesium metal, and the tetrahydrofuran was removed by evacuation. The brown residue was extracted with dry hexane (500 mL), and combined extracts were concentrated in vacuo. Unreacted tetraethyl orthosilicate was removed in vacuo ($10^3$ torr), leaving a tea-brown oil. Two distillations gave the product as a clear, colorless oil (0.1 mm Hg, 126–128° C., 58.0 g., 34%). Anal. Calcd for $C_{18}H_{34}O_6Si_2$: C, 53.7; H, 8.51. Found: C, 54.1; H, 8.59. IR (Neat, CsI, cm$^{-1}$): 3060 W, 2970 s, 2920 s, 2880 s, 2730 w, 1577 m, 1478 w, 1439 m, 1390 s, 1365 m, 1290 m, 1160 s, 1090 vs, 958 s, B05 s, 770 s, 715 m, 705 m, 670 m, 485 s. $^1$H NMR (benzene-d$_6$, 22° C., 300 MHz ): δ 1.15 (t, J=7.1 Hz, 18 H, OCH$_2$CH$_3$), 3.91 (q, J=7.1 Hz, 12 H, OCH$_2$CH$_3$), 7.30 (t, J=7.2 Hz, 1 H, C$_6$H$_4$), 7.89 (d, J=7.2 Hz, 2 H, C$_6$H$_4$), 8.37 (s, 1 H, C$_6$H$_4$). $^{13}$C{$^1$H}NMR (benzene-d$_6$, 22° C., 75.5 MHz): δ 18.43 (PHC$_2$CH$_3$), 58.89 (OCH$_2$CH$_3$), 127.59, 131.52, 137.06, 141.70 (C$_6$H$_4$)

1,2-Di(triethoxysilyl)benzene. The procedure used for the preparation of 1,3 di(triethoxysilyl) benzene was followed using 1,2 dibromobenzene (100.0 g, 0.424 mg). The product after two distillations was a clear colorless oil (11.9 g, 7%). IR (Neat, CsI, cm$^{-1}$): 3040 w, 2963 s, 2920 s, 2880 s, 730 w, 1480 w, 1436 m, 1426 w, 1310 w, 1290 w, 1160 s, 1100 vs, 955 s, 780 s, 755 s, 718 m, 700 m, 668 w, 515 m, 484 m. $^1$H NMR (benzene-d$_6$, 22° C., 300 MHz ): δ 1.21 (t, J=7.2 Hz, 18 H, OCH$_2$CH$_3$), 3.91 (q, J=7.2 Hz, 12H, OCH$_2$CH$_3$), 7.29 (dd, J=5.7 Hz, 2H, C$_6$H$_4$), 8.12 (dd, J=5.7 Hz, 2H, C$_6$H$_4$). $^{13}$C{:H} NMR (benzene-d$_6$, 22° C., 75.5 MHz ): δ 18.44 (OCH$_2$CH$_3$), 58.87 (OCH$_2$CH$_3$), 129.25, 137.19, 138.97 (C$_6$H$_4$).

1,3.5-Tri(triethoxysilyl)benzene. The procedure used for the preparation of 1,3-di(triethoxysilyl)benzene was followed using 1,3,5-tribromobenzene (100.0 g, 0.318 mol) in place of 1,3-dibromobenzene. Two distillations gave a clear, colorless oil (0.1 mmHg, 196–198° C., 23.4 g, 13%). Anal. Calcd for $C_{24}H_{48}O_9Si_3$: C, 51.0: H, 8.56. Found: C, 51.2; H, 8.53. IR (Neat, CsI, cm$^{-1}$) : 2964 s, 2920 s, 2880 s, 2730 w, 1560 m, 1480 w, 1440 m, 1386 s, 1290 m, 1160 s, 1090 vs, 955 s, 825 s, 775 s, 710 m, 670 m, 487 s. $^1$H NMR (benzene —d$_6$, 22° C., 300 MHz : δ 1.16 (t, J=7.1 Hz, 18 H, OCH$_2$CH$_3$), (q, J=7.1 Hz, 12 H, OCH$_2$CH$_3$, 8.55 (s, 1H, C$_6$H$_4$). $^{13}$C{$^1$H} NMR (benzene-d$_6$, 22° C., 75.5 MHz ): δ 18.43 (OCH$_2$CH$_3$), 58.92 (OCH$_2$CH$_3$), 130.83, 143.60 (C$_6$H$_4$).

2.5-Di(triethoxysilyl)thiophene. The procedure used for the preparation of 1,3-di(triethoxysilyl)benzene was followed, using 2,5-dibromothiophene (100.0 g, 0.413 mol) in place of 1,3-dibromobenzene. Two distillations gave a clear, colorless oil (0.1 mmHg, 126–128 ° C.,64.1 g, 38%). Anal. Calcd for $C_{16}H_{32}O_6SSi_2$: C, 47.0: H, 7.89. Found C, 47.3; H, 4.91. IR (Neat, CsI, cm$_{-1}$): 2970 s, 2920 s, 2880 s, 2730 w, 1485 m, 1440 m, 1388 s, 1362 w sh, 1290 m, 1268 w, 1200 s, 1165 s, 1090 vs, 1025 s, 960 s, 780 s, 750 m, 695 s, 520 s. $-^1$H NMR (benzene-d$_6$, 22° C., 300 MHz ): δ 1.14 (t, J=6.9 Hz, 18 H, OCH$_2$CH$_3$), 3.85 (q, J=6.9 Hz, 12 H, OCH$_2$CH$_3$), 7.66 (s, 2 H, C$_4$H$_2$S). $^{13}$C{$^1$H} NMR (benzene-d$_6$, 22° C., 75.5 MHz ): δ 18.38 (OCH$_2$CH$_3$), 59.17 (OCH$_2$CH$_3$), 137.61, 137.78 (C$_4$H$_2$S). 1,4-(H$_3$Si)$_2$C$_6$H$_4$. A solution of 1,4-di(triethoxysilyl)benzene (44.49, .110 mol) in ether (50mL) was added dropwise to a vigorously stirred suspension of LiAlH(7.85 g, .206.mol) in ether (400 mL) at 0° C. A white precipitate formed immediately. After the addition was complete the solution was allowed to warm to room temperature and then stirred at room temperature for 36 hours. The reaction mixture was then filtered, and the filtrate concentrated to ca. 50 mL and bulb to bulb distilled in vacuo ($10^{-3}$ torr) at 35° C. (no warmer due to the presence of unreacted LiAlH$_4$). Pure product (9.5 g, 63%) was obtained by fractional distillation through a 20 cm Vigreux column at atmospheric pressure (bp 140-142° C.; lit. bp 31° C./10 mmHg). IR (Neat, CsI, cm$_{-1}$); 3400 m, 3000 m, 2940 w, 2150 s, 1374 s, 1130 s, 1020 m, 910 s, 840 m, 810 m, 650 s, 490 s. $^1$H NMR (benzene-d$_6$, 22° C., 300 MHz ): δ 4.17 (s, 6 H, SiH$_3$), 7.29 (s, 4 H, C$_6$H$_4$) $^{13}$C{$^1$H} NMR (benzene-d$_6$, 22° C., 75.5 MHz ): δ 130.16, 135.58 (C$_6$H$_4$). $^{29}$Si NMR (benzene-d$_6$, 22° C., 59.6 MHz ); δ −62.65 (q, J$_{SiH}$=202 H$_2$). Anal. Calcd for C$_6$H$_{10}$Si$_2$: C, 52.1; H, 7.29. Found: C, 53.0; H, 7.34.

1,3-(H$_3$Si)$_2$C$_6$H$_4$. A procedure analogous to that described above for 1,4-(H$_3$Si)$_2$C$_6$H$_4$ was used, with 1,3-di(triethoxysilyl)benzene (15.0 g, 37.3 mmol) reacting with lithium aluminum hydride (4.0 g, 105 mmol) to yield 3.5 g (68%) of 1,3-(H$_3$Si)$_2$C$_6$H$_4$ after 2 vacuum distillations (bp 58–59 ° C. at 25 mmHg; lit. bp 59° C. at 25 mmHg). Anal. Calcd for C$_6$H$_{10}$Si$_2$: C, 52.1; H, 7.29. Found: C, 52.2; H, 7.41. IR (Neat, CsI, cm$^{-1}$): 3060 w, 3030 w, 3007 w, 2980 w, 2150 s, 1570 w, 1460 w, 1373 m, 1137 w, 1130 w, 1102 s, 910 s, 710 s, 640 s sh, 625 s, 595 w sh, 386 m. $^1$H NMR (benzene-d$_6$, 22° C., 300 MHz ): δ 4.17 (s, 6 H, SiH$_3$), 6.98 (t, J=7.5 Hz, 1 H C$_6$H$_4$), 7.33 (t, J=7.5 Hz, 2 H, C$_6$H$_4$), 7.66 (s, 1 H, C$_6$H$_4$). $^{13}$C{$^1$H} NMR (benzene-d$_6$, 22° C., 75.5 MHz ): δ 128.00, 135.59, 137.43, 143.55 (C$_6$H$_4$). $^{29}$Si NMR (benzene-d$_6$, 22° C., 59.6 MHz ): δ −62.60 (q, J$_{SiH}$=200 Hz).

1.2-(H$_3$Si)$_2$C$_6$H$_4$ 1,2-di(triethoxysilyl)benzene (15.0g, 37.3 mmol) was added to lithium aluminum hydride (4.0g. 105 mmol). The mixture was allowed to stir at room temperature for 20 hours. A bulb-to-bulb vacuum distillation and a vacuum redistillation yielded 3.0g (58%) of product boiling at 58–59° C. (25 mmHg). Anal.Calcd for C$_6$H$_{10}$Si$_2$:C, 52.1; H,7.29. Found: C, 53.0; H, 7.34. IR (Neat, Csl, cm$^{-1}$): 3100 w, 3043 m, 2975 W, 2150 s, 1445 W, 1420 m, 250 m, 1122 s, 1052 m, 1027 w, 920 s, 840 w, 752 m, 730 m, 697 m, 650 s, 430 m. $^1$H NMR (benzene-d$_6$, 22° C., 300 MHz ): δ 4.30 (s, 6H, SiH$_3$), 7.02 (dd J =5.4 Hz, 2H, C$_6$H$_4$), 7.39 (dd, J=5.4 Hz, 2H, C$_6$H$_4$). $^{13}$C{$^1$H} NMR (benzene-d$_6$, 22° C., 75.5 MHz): δ 129.66, 136.48, 137.45 (C$_6$H$_4$). $^{29}$Si NMR (benzene-d$_6$, 22° C., 59.6 MHz ): δ −64.47 (q, J$_{SiH}$=200 Hz).

1,4-(MeH$_2$Si)$_2$C$_6$H$_4$ The procedure used for the preparation of 1,2-(H$_3$Si)$_2$C$_6$H$_4$ was followed using 1,4-di(diethoxymethylsilyl)benzene (15.0g, 43.8 mmol) and lithium aluminum hydride (2.5g. 66 mmol). A bulb-to-bulb vacuum distillation and a vacuum redistillation yielded 4.81g (66%) of product boiling at 88–90° C. (25 mmHg). Anal.Calcd for C$_8$H$_{14}$Si$_2$:C, 57.8; H, 8.48. Found: C,58.8; H, 8.52. IR (Neat, CsI, cm$^{-1}$): 3040 m, 995 m, 2955 m, 2900 w, 2130 s, 1425 w, 1375 s, 1326 w, 1250 s, 1130 s, 1115 m sh, 1075 m, 1020 w, 940 s, 880 vs, 810 m, 730 s, 688 s, 500 m, 476 s. $^1$H NMR (benzene-d$_6$, 22° C., 300 MHz): δ 0 19 (t, J=4.2 Hz, 6H, Me), 4.46 (q, J=4.2 MHz , 4H, SiH$_3$), 7.44 (s, 4 Hz, C$_6$H$_4$) $^{13}$C{$^1$H} NMR (benzene-d$_6$, 22° C., 75.5 MHz ): δ 7.78(Me), 129.76, 134.65 (C$_6$H$_4$) $^{29}$Si NMR (benzene-d$_6$, 22° C., 59 6 MHz ): δ 38.40 (t, J$_{SiH}$=208 Hz).

3,5-(H$_3$Si)$_3$C$_6$H$_3$. A procedure analogous to that described above for 1,4-(H$_3$Si)$_2$C$_6$H$_4$ was used, with 1,3,5-tri(triethoxysilyl)benzene (15.0 g, 26.6 mmol) reacting with lithium aluminum hydride (4.90 g, 130 mmol) to yield 2.60 g (58%) of 1,3,5-(H$_3$Si)$_3$C$_6$H$_4$ after 2 vacuum distillations (bp 88–90° C. at 25 mmHg). Anal. Calcd for C$_6$H$_{12}$Si$_3$: C, 42.8; H, 7.18. Found: C, 42.4; H, 7.16. IR (Neat, CsI, cm$^{-1}$): 3060 w, 3000 m, 2150 s, 1845 W, 1795 W, 1550 W, 1380 m, 1150 W, 1130 w, 915 s, 790 w, 720 s, 640 s, 612 s, 595 m, 385 m. $^1$H NMR (benzene-d$_6$, 22° C., 300 MHz): δ 4.14 (s, 9 H, SiH$_3$), 7.65 (s, 3 H, C$_6$H$_4$). $^{13}$C{$^1$H} NMR (benzene-d$_6$, 22° C., 75.5 MHz): δ 128.07, 144.76 (C$_6$H$_4$). $^{29}$Si NMR (benzene-d$_6$, 22° C., 59.6 MHz): δ -62.40 (q. J$_{SiH}$=199 Hz).

4,4'-(H$_3$Si)$_2$biphenyl. A procedure analogous to that described above for 1,4-(H$_3$Si)$_2$C$_6$H$_4$ was used, with 4,4'-di(triethoxysilyl)biphenyl (20.0 g, 41.8 mmol) reacting with lithium aluminum hydride (4.74 g, 125 mmol) to yield crude solid 4,4'-(H$_3$Si)$_2$biphenyl, which was recrystallized from the cosolvent hexane/benzene (9:1) to yield 6.1 g (68%) of 4,4'-(H$_3$Si)$_2$biphenyl melting at 166–168° C. Anal. Calcd for C$_{12}$H$_{14}$Si$_2$: C, 67.2 H, 6.58. Found: C, 67.4; H, 6.54. IR (Nujol, CsI, cm$^{-1}$): 3070 w, 3010 w, 2142 s, 1590 w, 1525 w, 385 m, 1345 W, 1250 W, 1115 m, 920 s, 806 s, 730 s, 690 w, 644 s, 635 s sh, 380 w. $^1$H NMR (benzene-d$_6$, 22° C., 300 MHZ): δ 4.29 (s, 6 H, SiH$_3$), 7.34 (d, J=8.1 Hz, 4 H, biphenyl), 7.44 (d, J=8.1 Hz, 4 H, biphenyl). $^{13}$C{$^1$H} NMR (benzene-d$_6$, 22° C., 75.5 MHz ): 127.12, 127.40, 136.68, 142.46. $^{29}$Si NMR (benzene-d$_6$, 22° C., 59.6 MHz ): δ −62.88 (q. J$_{SiH}$=199 Hz).

2,5-(H$_3$Si)$_2$C$_4$H$_2$S. A procedure analogous to that described above for 1,4-(H$_3$Si)$_2$C$_6$H$_4$ was used, with 2,5-di(triethoxysilyl)thiphene (15.0 g, 36.7 mmol) reacting with lithium aluminum hydride (4.0 g, 105 mmol) to yield 2.65 g (50%) of 2,5-(H$_3$Si)$_2$C$_4$H$_2$S after 2 vacuum distillations (bp 58–62° C. at 25 mmHg). The material prepared in the above manner was contaminated with small amounts of 2,5-(H$_3$Si)$_2$C$_4$H$_6$S. [$^1$H NMR (benzene-d$_6$, 22° C., 300 MHz ): δ 1.16 (m, β-CH$_2$), 3.86 (m, α-CH$_2$), 4.29 (d, J=6.5 Hz, SiH$_3$)] Anal. Calcd for C$_4$H$_8$Si$_2$S: C, 33.3; H, 5.59. Found C, 36.5; H, 6.24. IR (Neat, CsI, cm$^{-1}$): 3060 w, 2963 m, 2920 w, 2880 w, 2160 s, 1485 m, 1405 W, 1386 W, 1270 m, 1200 s, 1165 m, 1100 s, 1080 s, 1018 s, 985 m, 905 vs, 806 s, 755 s, 695 s sh, 675 s, 600 w, 582 m, 460 m. $^1$H NMR (benzene-d$_6$, 22° C., 300 MHz): δ 4.23 (s, 6 H, SiH$_3$), 7.13 (s, 2 H, C$_4$H$_2$S). $^{13}$C{$^1$H} NMR (benzene-d$_6$, 22° C., 75.5 MHz): 133.31, 139.98 (C$_4$H$_2$S). $^{29}$Si NMR (benzene-d$_6$, 22° C., 59.6 MHz): δ -73.0 (q, J$_{SiH}$=212 Hz).

1.4-(hexylH$_2$Si)$_2$C$_6$H$_4$. The procedure used for the preparation of 1,2-(H$_3$Si)$_2$C$_6$H$_4$ was followed using 1,4-di(dimethoxy)hexylsilyl)benzene (11.9 g, 27.8 mmol) and lithium aluminum hydride (1.2 g, 31 mmol). Kuegelrohr distillation gave 4.98 g (58%) of product boiling at 120–122° C. (.01 mm Hg). $^1$H NMR (benzene-d$_6$, 22° C., 300 MHz): δ 0.780–0.880 (m, 10H), 1.114–1.313 (m, 12H), 1.339–1.447 (m, 4H), 4.483 (t, 4H, SiH$_2$), 7.526 (s, 4H, C$_6$H$_4$). $^{13}$C{$^1$H} NMR (benzene-d$_6$, 22° C., 75.5 MHz): δ 10.27, 14.28, 22.93, 25.42, 31.81, 32.89, 134.5. $^{29}$Si NMR (benzene-d$_6$, 22° C., 59.6 MHz): δ -30.65 (t, J$_{SiH}$=192 Hz).

1,6-disilylhexane. The procedure used for the preparation of 1,2-(H$_3$Si)$_2$C$_6$H$_4$ was followed using 1,6-di(trichlorosilyl)-exane (50.4 g, 143 mmol) and lithium aluminum hydride (8.2 g, 216 mmol). Vacuum distillation yielded 4.46 g (21%) of product boiling at 64° C. (22 mm Hg). $^1$H NMR (benzene-d$_6$, 22° C., 300 MHz): δ 0.510 (m, 4H), 1.144–1.245 (unresolved multiplet, 8H), 3.622 (t, 6H, SiH$_2$). $^{13}$C{$^1$H} NMR (benzene-d$_6$, 22° C., 75.5 MHz): δ 6.22 (H$_3$SiCH$_2$CH$_2$—), 26.63 (H$_3$SiCH$_2$CH$_2$—), 32.50 (H$_3$SiCH$_2$CH$_2$CH$_2$—). $^{29}$Si NMR (benzene-d$_6$, 22° C., 59.6 MHz): δ −59.47 (q of t, $^1$J$_{SiH}$=92 Hz, $^2$J$_{SiH}$=6 Hz).

EXAMPLE 2

Polymerization of 1,3-(H$_3$Bi)$_2$C$_6$H$_4$ 1,3-(H$_3$Si)$_2$C$_6$H$_4$ (2.00 g, 14.5 mmol) Was added to a benzene solution (5 mL) of [CpCp*ZrH$_2$]$_2$ (85 mg, 0.29 mmol). The reaction immediately turned dark brown, and the reaction medium became rapidly viscous with strong gas evolution. Benzene (ca. 20 mL) was added to the reaction mixture. The mixture was vigorously stirred under a stream of argon for 24 hours, resulting in a heterogeneous chocolate colored solution. The catalyst was oxidized by exposure to air, and then the product polymer was collected on a glass fritted funnel by suction filtration in air. The collected polymer was washed with benzene (500 mL) and ethyl ether (200 mL), and dried under vacuum giving 1.71 g of off-white solid (mp >300° C). The resulting polymer was insoluble in most organic solvents. A scanning electron micrograph showed evidence of microporosity. An average degree of cross-linking was determined to be 55% as determined from the CRAMPS solid-state $^1$H NMR spectrum. An average degree of cross-linking of 55% was calculated from the combustion analysis found for H (Found: C, 54.8; H, 5.18). IR (Nujol, CsI, cm$^{-1}$): 3600 m, 3300 m, 2110 s (Si-H stretching), 1310 m, 1244 w, 1175 w, 1130 W, 1096 s, 990 W, 910 s (SiH$_2$ bending), 750 s br, 645 s, 600 s, 440 w, 405 m, 384 m. CRAMPS $^1$H NMR (150 MHz): δ 4.29 (broad unresolved massifs, 2 H [2.34 H], SiH), 6.86 (broad unresolved massifs, 4 H [4.0H], C$_6$H$_4$). CP/MAS $^{29}$Si NMR (29.8 MHz): δ −60.6 (broad unresolved massifs).

EXAMPLE 3

Polymerization of 1,4-(H$_3$Si)$_2$C$_6$H$_4$

The procedure for the polymerization of 1,3-(H$_3$Si)$_2$C$_6$H$_4$:] was used. The collected polymer was washed with benzene (500 mL) and ethyl ether (200 mL), and dried under vacuum giving 1.69 g of off-white solid [1,4-H$_x$Si)$_2$C$_6$H$_4$]$_n$ (mp>300° C.). The polymer was insoluble in most organic solvents. A scanning electron micrograph showed evidence of microporosity. X-ray powder pattern analysis was featureless, which suggests that the polymer has an amorphous, glass-like structure. The specific surface area measured by the BET adsorption analysis method was 604 m$^2$/g. An average degree of cross-linking of 765% was calculated from the CRAMPS solid-state $^1$H NMR spectrum. An average degree of cross-linking of 55% was calculated from the combustion analysis found for H (Found: C, 52.9; H, 5.13). IR (Nujol, CsI, cm$^{-1}$): 3030 m, 2100 (Si-H stretching), 1295 m, 1230 w, 1115 m, 1010 W, 906 s (SiH$_2$ bending), 840 w, 805 m sh, 765 s sh, 740 s sh, 715 s, 640 m, 600 m, 590 m sh, 475 m. CRAMPS $^1$H NMR (150 MHz): δ 4.42 (broad unresolved massifs 2 H [2.65 H], SiH), 7.05 (broad unresolved massifs, 4 H [4.0 H], C$_6$H$_4$) CP/MAS $^{29}$Si NMR (29.8 MHz): δ −60.6 (broad unresolved massifs).

EXAMPLE 4

Polymerization of 1.2-(H$_3$Si)$_2$C$_6$H$_4$ 1,2-(H$_3$Si)$_2$C$_6$H$_4$ (2.0g. 14.5mmol) was added to a benzene solution (3mL) of [CpCp*ZrH$_2$]$_2$ (85mg, 0.29mmol). The reaction immediately turned yellow, and the color rapidly changed to green then to dark brown. The mixture was vigorously stirred under a stream of argon for 16 hours (no gelation is evident) and then pumped to dryness under vacuum. The nonvolatile materials were taken up in ca. 10 mL of toluene/hexane (2/1 v/v), the catalyst was allowed to oxidize by exposure to the air for a few seconds, and the solution was then passed rapidly through a Florisil column. The colorless effluent was evaporated to dryness to give 1.41g (71% isolated yield) of white solid (mp 100–118° C.). The polymer pentane and soluble in toluene and THF. A scanning electron micrograph showed a porosity absent smooth surface. $M_w/M_n=5425/1391$. Anal.- Calcd for $C_6H_6Si_2$: C, 53.7; H, 4.50. Found: C, 56.2; H, 5.75. IR (Thin film, CsI, cm$^{-1}$): 3040 m 2950 m, 2110 s, (Si-H stretching), 1580 w, 1565 w, 1540 w, 1480 w, 1425 m, 1370 w, 1326 w, 1245 m, 1060 s br, 915 s (SiH$_2$bending), 835 s br, 740 s br, 488 m. $^1$H NMR (benzene-d$_6$, 22° C., 300 MHz): δ 4.0–5.5 (broad unresolved massifs, 2H, SiH), 6.5–8.0 (broad unresolved massifs, 4H, C$_6$H$_4$).

EXAMPLE 5

Polymerization of 1,3,5-(H$_3$Si)$_3$C$_6$H$_3$

The procedure for the polymerization of 1,3-(H$_3$Si)$_2$C$_6$H$_4$ was used. The collected polymer was washed with benzene (500 mL) and ethyl ether (200 mL), and dried under vacuum giving 1.80 g of off-white solid [1,3,5-(H$_3$Si)$_3$C$_6$H$_3$]$_n$ (mp >300° C.). The polymer was insoluble in most organic solvents. A scanning electron micrograph showed evidence of microporosity. An average degree of cross-linking of 20% was calculated from the CRAMPS solid state $^1$H NMR spectrum. An average degree of cross-linking of 27% was calculated from the combustion analysis found for H (Found: C, 43.7; H, 504). IR (Nujol, CsI, cm$^{-1}$): 2120 s (Si-H stretching), 1300 w, 1130 w, 910 s (SiH$_2$ bending), 870 w, 790 s, 730 s, 650 m, 610 w, 430 w, 385 w. CRAMPS $^1$H NMR (150 MHz): δ 4.10 (broad unresolved massifs, 3H [4.8 H], SiH), 7.45 (broad unresolved massifs, 3 H [3.0H], C$_6$H$_3$) CP/MAS $^{29}$Si NMR (29.8 MHz): δ −60.6 (broad unresolved massifs).

EXAMPLE 6

Polymerization of 4,4'-(H$_3$Si)$_2$biphenyl

The procedure for the polymerization of 1,3-(H$_3$Si)$_2$C$_6$H$_4$ was used. The collected polymer was washed with benzene (500 mL) and ethyl ether (200 mL), and dried under vacuum giving 1.74 g of off-white solid (H$_x$SiC$_6$H$_4$C$_6$H$_4$SiH$_x$)$_n$ (mp >300° C.). The polymer was insoluble in most organic solvents. A scanning electron micrograph showed evidence of microporosity. X-ray powder pattern analysis was featureless, which suggests that the polymer has an amorphous, glass-like structure. An average degree of cross-linking of 45% was calculated from the CRAMPS solid-state $^1$H NMR spectrum. An average degree of cross-linking of 45% was calculated from the combustion analysis found for H (Found: C, 66.2; H, 5 34). IR (Nujol, CsI, cm$^{-1}$) 3600 w, 3010 m, 2120 s (SiH stretching), 1590 m, 1525 w, 1300 w, 1250 w, 1105 m, 998 m, 913 s (SiH$_2$ bending), 840 w, 800 s, 740 w, 646 m, 605 w, 540 w, 490 w, 380 w. CRAMPS $^1$H NMR (150 MHz): δ 4.60 (broad unresolved massifs, 4 H [3.43 H], SiH), 6.90 (broad unresolved massifs, 8 H [8.0 H], C$_6$H$_3$). CP/MAS $^{29}$Si NMR (29.8 MHz): δ −60.6 (broad unresolved massifs).

EXAMPLE 7

Polymerization of 2.5-(H$_3$Si)$_2$C$_4$H$_2$S

The procedure for the polymerization of 1,3-(H$_3$Si)$_2$C$_6$H$_4$ was used. The collected polymer was washed with benzene (500 mL) and ethyl ether (200 mL), and dried under vacuum giving 1.81 g of off-white solid [H$_x$SiC$_4$H$_2$SiH$_x$]n (mp>300° C.). The polymer was insoluble in most organic solvents. A scanning electron micrograph showed evidence of microporosity. The reduction of the thienyl rings (ca. 24% reduction based on CRAMPS $^1$H NMR, assuming that no hydrosilation of the thienyl ring occurred) apparently occurred by [CpCp*ZrH$_2$]$_2$-catalyzed hydrogenation. By assuming that hydrosilation on the thienyl ring had not occurred, an average degree of cross-linking of 45% was calculated from the CRAMPS solid-state $^1$H NMR spectrum. An average degree of cross-linking of 45% was calculated from the combustion analysis found for H (Found: C, 35.7; H, 4.05; S, 21.4). IR (Nujol, CsI, cm$^{-1}$): 3400 w, 2110 s (Si-H stretching), 1260 m, 1196 s, 1070 s br, 1000 s br, 900 s (SiH$_2$ bending), 700 s br, 470 m. CRAMPS $^1$H NMR (150 MHz): δ 1.10 (broad unresolved massifs, 4H [0.63 H], CH$_2$CH$_2$), 4.20 (broad unresolved massifs, 2 H [3.13 H, SiH), 6.50 (broad unresolved massifs, 2 H [2.0 H], C$_4$H$_{22}$S).

EXAMPLE 8

Preparation of the Copolymer of PhSiH$_3$ and 1.4-(H$_3$Si)$_2$C$_6$H$_4$

PhSiH$_3$ (1.60g, 14.8mmol) and 1,4-(H$_3$Si)$_2$C$_6$H$_4$ (0.227g, 1.64mmol) were added to a benzene solution (4mL) of CpCp*ZrH$_2$]$_2$ (94mg, 0.32mmol). The reaction immediately turned dark red-brown with strong gas evolution. The mixture was vigorously stirred under a stream of argon for 16 hours and the volatiles were then removed under vacuum. After redissolution in ca. 10mL of toluene/hexane (2/1 v/v) where the solution was a little turbid, the catalyst was allowed to oxidize by exposure to the air for a few seconds. The solution was then passed rapidly through a Florisil column to remove the Zr species. The colorless effluent was evaporated to dryness to give 1.24g (62% isolated yield) of white solid (mp 100–110° C.). The 9:1 copolymer was insoluble in pentane and soluble in toluene and THF. A scanning electron micrograph showed a porosity-free smooth surface. $M_w/M_n=2185/986$. Anal.Calcd for C$_6$H$_6$Si$_{1.1}$: C, 66.1; H, 5.55. Found: C, 66.3; H, 5.55. IR(Nujol, CsI, cm$^{-1}$): 3600 m, 3400 m, 2090 s (Si-H stretching), 1480 m, 1425 s, 1330 w, 1295 w, 1258 w, 1185 W, 1155 W, 1100 m, 1060 W, 1023 W, 995 m, 910 m (SiH$_2$ bending), 840 w, 775 s, 730 s, 695 s, 610 m, 598 m, 440 m, 380 w. $^1$H NMR (benzene-d$_6$, 22° C., 300 MHz); δ 4.2–5.6 (broad unresolved massifs, 1 H, SiH), 6.4–8.0 (broad unresolved massifs, 4.5 H, phenyl). $^{29}$Si NMR (benzene-d$_6$, 22° C., 59.6 MHz): δ −50 to −72 (broad unresolved massifs). Copolymerization of a mixture of PhSiH$_3$ (0.696g, 6.43mmol) and the disilane monomer (0.227 g, 1.61mmol) in an 8:2 ratio gave 0.51 g of a benzene-insoluble polysilane via a suction filtration with 0.28 g of pentane-insoluble but benzene-soluble polysilane by passing through a Florisil column. Gelation was not instantaneously occurred, but it slowly occurred over 16 hours. The solution was not wholly viscous, but gelation was visually evident. Copolymerization of a mixture of PhSiH$_3$ (0.608g, 5.62mmol) and disilane monomer (0.333 g, 2.41mmol) in a 7:3 ratio gave 0.65 g of benzene-insoluble polysilane with a 0.13 g of a pentane-insoluble but benzene-soluble polysilane. Gelation began after ca. 2 hours and slowly occurred over 16 hours. The solution was not wholly viscous. Copolymerization of a mixture of PhSiH$_3$ (0.522 g, 4.82 mmol) and disilane monomer (0.444 g. 3.21 mmol) in a 6:4 ratio gave 0.80 g of a benzene-insoluble polysilane with 0.08 g of a pentane-insoluble but benzenesoluble polysilane. Gelation began after ca. 40 minutes and the solution became wholly viscous 10 hours later. Copolymerization of a mixture of PhSiH$_3$ (0.541 g, 5.0 mmol) and disilane monomer (0.692g, 5.0mmol) in a 1:1 ratio gave 0.872 g of a benzene-insoluble polysilane without a pentane-insoluble but benzene-soluble polysilane. Gelation began ca. 10 minutes later and the solution became wholly viscous over 2 hours.

EXAMPLE 9

Polymerization of 1,4-(MeH$_2$Si)$_2$C$_6$H$_4$ 1,4-(MeH$_2$Si)$_2$C$_6$H$_4$ (2.0 g, 12.3 mmol) was added to a toluene solution (1 mL) of CpCp*Zr[Si(SiMe$_3$)$_3$]Me (332 mg, 0.60 mmol). The reaction mixture was heated at 85° C. for 4 days while it was vigorously stirred under a stream of argon. The reaction slowly turned yellow, and the reaction medium became gradually thick over 4 days. The catalyst was allowed to oxidize by exposure to the air for a few seconds and the product polymer was dissolved in THF. GPC showed M$_n$=2188 and M$_w$=90,602.

EXAMPLE 10

Polymerization of 1,2-(H$_3$Si)$_2$C$_2$H$_4$

The procedure for the polymerization of 1,3-(H$_3$Si)$_2$C$_6$H$_4$ was used. The collected polymer was washed with benzene and diethyl ether giving 0.86 g polymer. Heating the polymer caused it to become pyrophoric. This polymer was insoluble in most organic solvents.

EXAMPLE 11

Polymerization of 1,6-(H$_3$Si)$_2$C$_6$H$_{12}$

The procedure for the polymerization of 1,3-(H$_3$Si)$_2$C$_6$H$_4$ was used. The collected polymer was washed with benzene and diethyl ether to give 1.1 g polymer. This polymer was insoluble in most organic solvents.

EXAMPLE 12

Doping with Sodium and Iodine

Iodine doping was performed by diffusion of iodine vapor onto finely divided polymer prepared from 1,4-(H$_3$Si)$_2$C$_6$H$_4$ at room temperature in a sealed vessel under reduced pressure (0.1 mmHg). The color of the polymer sample turned yellow by partial oxidation [iodine on ca. 15% of silicon from a formula of (I$_2$)$_{0.1}$. 5SiH$_{1.32}$-C$_6$H$_4$-SiH$_{1.32}$(I$_2$)$_{0.15}$] with iodine vapor not only on the surface but also throughout the volume of the sample. When the iodine doped polysilane was exposed to air, undoping in 1 hour occurred and the initial polymer could be recovered Anal.Calcd for C$_6$H$_{6.64}$Si$_2$-(I$_2$)$_{0.30}$: c, 34.1; H,3.17; I, 36.1. Found: C, 32.9; H, 3.18; I, 36.1. The sodium doping was performed by dipping the finely divided polymer sample in a THF solution of sodium benzophenone ketyl. The color of the polymer sample turned deep red by partial reduction [sodium on ca. 20% of silicon from a formula of [(SiH$_{1.32}$-C$_6$H$_4$-SiH$_{1.32}$) (Na)$_{0.39}$] with sodium metal not only on the surface but also throughout the volume of the sample. When the sodium-doped polysilane was exposed to air, undoping in 10 minutes occurred. Anal.Calcd for C$_6$H$_{6.64}$Si$_2$(Na)$_{0.39}$: C, 50.1; H, 4.65; Na, 6.23. Found: C, 56.4; H, 6.43; Na, 6.24.

While the invention has been described with reference to exemplary embodiments thereof, it should be noted by those skilled in the art that the disclosures are exemplary only and that various other alternatives, adaptations and modifications may be made within the scope of the present invention. Accordingly, the present invention is not limited to the specific embodiments as illustrated herein, but only by the following claims.

What is claimed is:

1. A method of preparing a polymer by polymerization of a monomer mixture comprising at least one compound of the formula I

$$(RH_2Si)_xA \qquad (I)$$

wherein
R is selected from the group consisting of hydrogen, unsubstituted alkyl, substituted alkyl, unsubstituted aryl and substituted aryl;
A is a polyvalent moiety selected from the group consisting of aliphatic hydrocarbon groups containing 1 to 20 carbon atoms, unsubstituted aryl groups, substituted aryl groups, unsubstituted heteroaryl groups, substituted heteroaryl groups, organometallic complexes and silane groups containing 1 to 20 silicon atoms; and
x is 2–4, said method comprising:
admixing the monomer mixture with a catalyst selected from the group consisting of d$^o$ and d$^o$F$^n$ hydrides and precursors thereof in an inert solvent to form a reaction mixture; and
recovering the polymer from the reaction mixture.

2. A method according to claim 1, wherein the catalyst is selected from the group consisting of [CpCp*MH$_2$]$_2$, CpCp*M[Si(SiR$_3$)$_3$]Cl, CpCp*M[Si(-SiR$_3$)$_3$]R', Cp*$_2$MH$_2$, Cp$_2$MR$_2$, [Cp*$_2$M'H]$_2$, Cp$_2$TiR$_2$ and precursors thereof, in which Cp is cyclopentadienyl, Cp* is pentamethylcyclopentadienyl, M is Zr of Hf, M' is Nd or Sm, and R and R' are independently alkyl or aryl.

3. A method according to claim 2, wherein the catalyst is [CpCp*MH$_2$]$_2$.

4. A method according to claim 3, wherein M is Zr.

5. A polymer material based on structural units corresponding to general formula

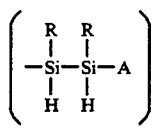

wherein
each R is independently selected from the group consisting of hydrogen, unsubstituted alkyl, substituted alkyl, unsubstituted aryl and substituted aryl; and
A is a polyvalent moiety selected from the group consisting of aliphatic hydrocarbon groups containing 1 to 20 carbon atoms, unsubstituted aryl groups, substituted aryl groups, unsubstituted heteroaryl groups, substituted heteroaryl groups, organometallic complexes and silane groups containing 1 to 20 silicon atoms, prepared according to the method of claim 1.

6. A polymer material according to claim 5, wherein A is phenyl, biphenyl, thiophene or $-(CH_2)_n-$, in which n is an integer from 1 to 6 inclusive.

7. A polymer material according to claim 5, wherein R is selected from the group consisting of unsubstituted alkyl, substituted alkyl, unsubstituted aryl and substituted aryl.

8. A polymer material according to claim 7, wherein R is methyl or phenyl.

9. A polymer material according to claim 5, wherein R is hydrogen.

10. A polymer material according to claim 5, wherein x is 2 or 3.

11. A polymer material according to claim 5, wherein the monomer mixture consists essentially of at least one compound of the formula I.

12. A polymer material according to claim 11, wherein said compound is selected from the group consisting of 1,2-$(H_3Si)_2C_6H_4$, 1,3-$(H_3Si)_2C_6H_4$, 1,4-$(H_3Si)_2C_6H_4$, 1,3,5-$(H_3Si)_3C_6H_3$, 4,4'-$(H_3Si)_2$biphenyl, 2,5-$(H_3Si)_2C_4H_2S$ and 1,4-$(MeH_2Si)_2C_6H_4$.

13. A polymer material according to claim 5, wherein the monomer mixture further comprises at least one silane of the formula II $$R'R''SiH_2 \qquad (II)$$

wherein R' and R'' are independently selected from the group consisting of hydrogen, unsubstituted alkyl, substituted alkyl, unsubstituted aryl and substituted aryl.

14. A polymer material according to claim 13, wherein the monomer mixture comprises a compound of formula I and a compound of formula II in a ratio of from about 9:1 to about 1:1.

* * * * *

UNITED STATES PATENT AND TRADEMARK OFFICE
CERTIFICATE OF CORRECTION

PATENT NO. : 5,229,481  Page 1 of 4
DATED : July 20, 1993
INVENTOR(S) : Tilley, T. Don It is certified that error appears in the above-identified patent and that said Letters Patent is hereby corrected as shown below:

| COLUMN | LINE | |
|---|---|---|
| 1 | 61 | After "310", change "." to --,--. |
| 3 | 38 | After "trans", change "." to --,--. |
| 4 | 61 | Change "som" to --some--. |
| 6 | 38 | Change "speo" to --spec--. |
| 6 | 49 | Add --.-- after ")". |
| 8 | 38 | Change "dibromodegassed" to --dibromo--. |
| 9 | 7 | After "(Neat," change "CsI" to --CsI--. |
| 9 | 8 | After "3060" change "W" to --w--. |
| 9 | 10 | Change "B05" to --805--. |
| 9 | 15 | After "18.43" change "(PHC" to --(OCH--. |
| 9 | 16 | Add --.-- after "($C_6H_4$). |
| 9 | 22 | Change "730" to --2730--. |
| 9 | 27 | Change "{:H}" to --{$^1$H}--. |
| 9 | 31 | Change "1,3.5" to --1,3,5--. |
| 9 | 51 | After "CsI, change "$cm_{-1}$" to --$cm^{-1}$--. |
| 9 | 54 | Change "$^{-1}$H" to --$^1$H--. |
| 9 | 60 | Change "44.49" to --44.4g--. |
| 9 | 62 | Add --$_4$-- at the end of "LiAlH". |
| 10 | 5 | After "cm" change "$._1$" to --$^{-1}$--. |
| 10 | 8 | Add --.-- at the end of the second occurrence of ")". |

UNITED STATES PATENT AND TRADEMARK OFFICE
CERTIFICATE OF CORRECTION

PATENT NO. : 5,229,481
DATED : July 20, 1993
INVENTOR(S) : Tilley, T. Don

It is certified that error appears in the above-indentified patent and that said Letters Patent is hereby corrected as shown below:

| | | |
|---|---|---|
| 10 | 11 | Change "H$_2$" to --Hz--. |
| 10 | 24 | Add --,-- at the end of "1 H". |
| 10 | 29 | Change "1.2" to --1,2-- |
| 10 | 36 | Change "CsL" to --CsI--. |
| 10 | 37 | After "2975" change "W" to --w--. |
| 10 | 37 | Change "250" to --1250--. |
| 10 | 39 | Delete "." after "22°C". |
| 10 | 52 | Change "995" to --2995--. |
| 10 | 55 | Change "0 19" to --0.19--. |
| 10 | 58 | Change "59" to --59.6--. |
| 10 | 60 | Change "3,5" to --1,3,5--. |
| 10 | 67 | After "1845" change "W" to --w--. |
| 10 | 68 | After "1795" change "W" to --w--. |
| 10 | 68 | After "1550" change "W" to --w--. |
| 10 | 68 | After "1150" change "W" to --w--. |
| 11 | 3 | Change "C$_6$H$_4$)." to --C$_6$H$_3$).-- |
| 11 | 15 | Change "385" to --1385--. |
| 11 | 15 | After "1345" change "W" to --w--. |
| 11 | 15 | After "1250" change "W" to --w--. |
| 11 | 20 | After "):" add --δ--. |

UNITED STATES PATENT AND TRADEMARK OFFICE
CERTIFICATE OF CORRECTION

Page 3 of 4

PATENT NO. : 5,229,481
DATED : July 20, 1993
INVENTOR(S) : Tilley, T. Don

It is certified that error appears in the above-indentified patent and that said Letters Patent is hereby corrected as shown below:

| | | |
|---|---|---|
| 11 | 26 | Change "thiphene" to --thiophene--. |
| 11 | 36 | After "1405" change "W" to --w--. |
| 11 | 36 | After "1386" change "W" to --w--. |
| 11 | 44 | Change "1.4" to --1,4--. |
| 11 | 52 | Change "C6H$_4$" to --C$_6$H$_4$--. |
| 12 | 2 | Change "(H$_3$Bi)" to --(H$_3$Si)--. |
| 12 | 4 | Change "Was" to --was--. |
| 12 | 26 | After "1130" change "W" to --w--. |
| 12 | 26 | After "990" change "W" to --w--. |
| 12 | 37 | Delete ":" after "H$_4$". |
| 12 | 51 | After 2100 add --s--. |
| 12 | 52 | After "1010", change "W" to --w--. |
| 12 | 57 | Add --.-- after "C$_6$H$_4$)". |
| 12 | 61 | Change "1.2" to --1,2--. |
| 13 | 8 | After "polymer" add --was insoluble in--. |
| 13 | 40 | Add --.-- after "C$_6$H$_3$)". |
| 13 | 59 | Change "5 34" to --5.34--. |
| 13 | 60 | Add --:-- after the first occurrence of ")". |
| 13 | 64 | Change "6.90" to --6.80--. |
| 14 | 3 | Change "2.5" to --2,5--. |

UNITED STATES PATENT AND TRADEMARK OFFICE
CERTIFICATE OF CORRECTION

PATENT NO. : 5,229,481
DATED : July 20, 1993
INVENTOR(S) : Tilley, T. Don

It is certified that error appears in the above-indentified patent and that said Letters Patent is hereby corrected as shown below:

| | | |
|---|---|---|
| 14 | 26 | Change "$C_4H_{22}S$" to --$C_4H_2S$--. |
| 14 | 30 | Change "1.4" to --1,4--. |
| 14 | 34 | Add --[-- before "CpCp". |
| 14 | 52 | After "1185" change "W" to --w--. |
| 14 | 52 | After "1155" change "W" to --w--. |
| 14 | 52 | After "1060" change "W" to --w--. |
| 14 | 52 | After "1023" change "W" to --w--. |
| 15 | 61 | Add --.-- after "recovered". |
| 16 | 35 | Change "$d°F^m$" to --$d°f^m$--. |
| 16 | 44 | Change "of" to --or--. |

Signed and Sealed this

Fifth Day of April, 1994

Attest:

BRUCE LEHMAN

Attesting Officer  Commissioner of Patents and Trademarks